United States Patent [19]

Netzel

[11] 4,078,304
[45] Mar. 14, 1978

[54] CUTTER FOR CORRUGATED PIPE FOR FLEXIBLE GAS INSULATED TRANSMISSION LINE

[75] Inventor: Philip C. Netzel, Milmont Park, Pa.

[73] Assignee: I-T-E Imperial Corporation, Spring House, Pa.

[21] Appl. No.: 718,879

[22] Filed: Aug. 30, 1976

[51] Int. Cl.² ............... B23D 21/06; B26B 27/00; B26D 3/16
[52] U.S. Cl. ................................. 30/101; 30/90.2; 30/95
[58] Field of Search ............... 30/101, 102, 95, 96, 30/94, 93, 90.2, 90.3

[56] References Cited

U.S. PATENT DOCUMENTS

| 76,729 | 4/1868 | De Galleford | 30/94 |
|---|---|---|---|
| 554,028 | 2/1896 | Marso | 30/95 |
| 1,168,344 | 1/1916 | Spencer | 30/101 |
| 1,872,199 | 8/1932 | Way | 30/101 |
| 2,271,033 | 1/1942 | Petersen | 30/102 |
| 2,511,358 | 6/1950 | Mayer et al. | 30/102 |
| 2,515,627 | 7/1950 | Capewell | 30/102 |
| 2,716,280 | 8/1955 | Ruhe | 30/101 X |
| 2,761,212 | 9/1956 | Gill | 30/100 |
| 3,196,652 | 7/1965 | Meese | 30/101 X |

FOREIGN PATENT DOCUMENTS

| 129,639 | 4/1902 | Germany | 30/95 |
|---|---|---|---|
| 115,537 | 2/1900 | Germany | 30/102 |
| 13,011 | 9/1887 | United Kingdom | 30/101 |

*Primary Examiner*—Gary L. Smith
*Assistant Examiner*—J. T. Zatarga
*Attorney, Agent, or Firm*—Ostrolenk, Faber, Gerb & Soffen

[57] ABSTRACT

A cutter for corrugated aluminum flexible pipe having a plurality of successive circumferential corrugations. The cutter frame is formed of two members hinged at one end and releasably closed at the other end to form a ring, a guide wheel or wheels ride the crest of one corrugation and a resiliently flanged wheel or wheel opposed to the first guide wheel or wheels ride the trough on either side. The blade is connected adjacent to one or between a pair of resiliently flanged wheels which permit the blade to be driven into the pipe. The C members are resiliently compressed toward each other by an adjustable spring controlling bolt which sets the pressure on the blade and allows for proper cutting even when the pipe varies in diameter. A handle recess or recesses on the ring receives a handle to rotate the ring for cutting.

9 Claims, 6 Drawing Figures

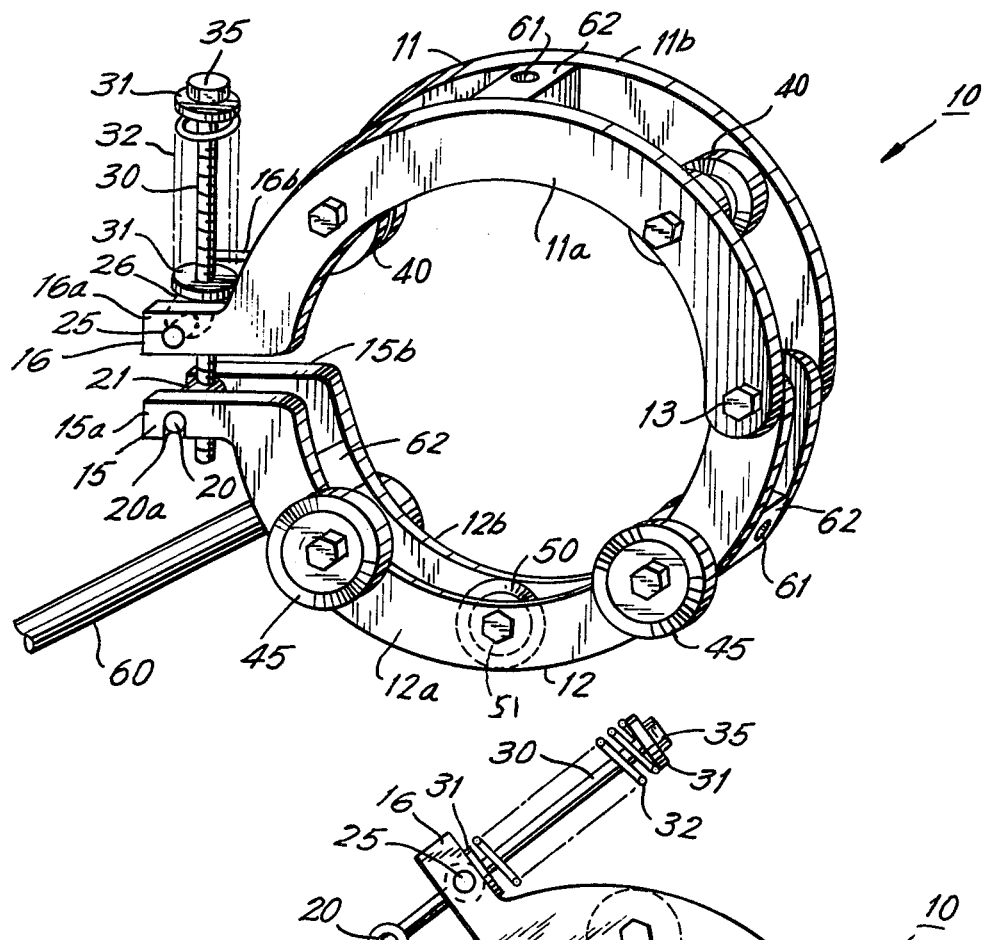
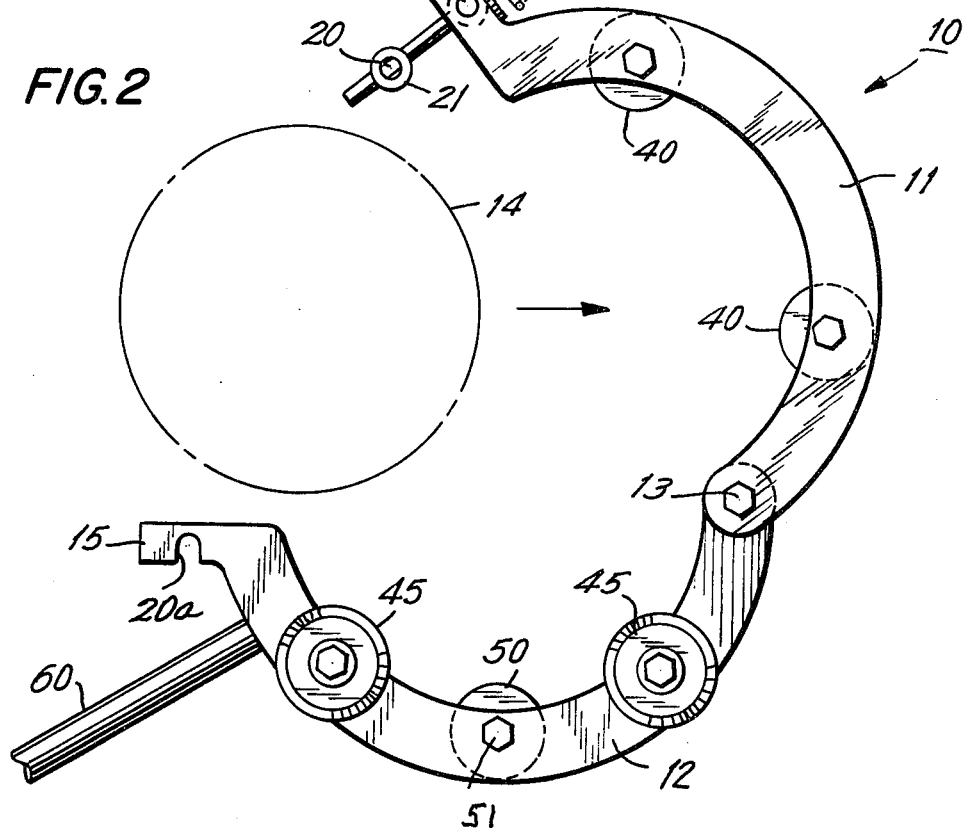

CUTTER FOR CORRUGATED PIPE FOR FLEXIBLE GAS INSULATED TRANSMISSION LINE

The present invention relates to a cutting device for corrugated aluminum pipe and more particularly corrugated aluminum pipe which is made of a series of successive parallel corrugations rather than the helical or coiled type. The corrugated aluminum pipe may be utilized in connection with flexible gas insulated transmission cables which consist of a conductor encased in such corrugated pipe type of enclosure. The conductor cable is supported and spaced from the enclosure in a manner which is now well known by disks or posts made of insulating material. The pipe may also be utilized for other purposes such as in water or heating systems.

If a fault or other defect should occur in such cable, it is desirable after the location thereof has been determined, to remove part of the enclosure in order to make the necessary repairs. However, to remove the enclosure requires the cutting of the corrugated pipe on both sides of the defective section. In the sale of conductors, since the integrity of the gas insulating medium as well as of the conductor is to be preserved, it is important that metallic particles be kept out of the insulating space. In other systems, metallic or other particles are also undesirable. This requirement of meticulous cutting of the enclosure rules out a circular saw or cutting torch for the opening of the pipe, therefore a cutter of the type which will make a slash or tear without removing any particles becomes desirable.

The primary object of the present invention, therefore, is the provision of a cutting member for aluminum or other metal cable, wherein the cutting member may be utilized in such manner as to open up a desired section of the metallic casing while maintaining the integrity of the interior of the enclosure and preventing the formation of metallic particles, dust or chips which may fall into the interior of the enclosure and not be readily detected.

The foregoing and many other objects of the present invention will become apparent in the following description and drawings in which:

FIG. 1 is a view in perspective of the novel clamp and cutting structure of the present invention.

FIG. 2 is a side view of the clamp and cutting structure of FIG. 1 opened so that it may encase a corrugated metallic enclosure.

Figure 4:
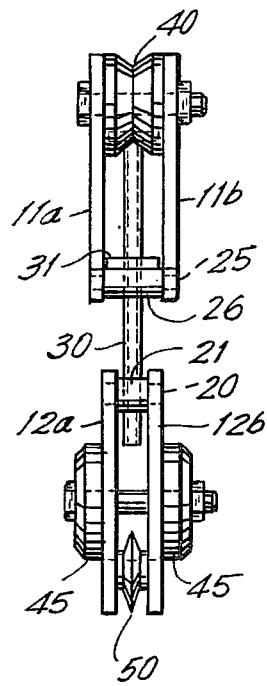
FIG. 4 is a view taken from line 4—4 of FIG. 3 looking in the direction of the arrows.

Referring now to the figures, and initially to FIGS. 1 and 2, the cutter 10 consists of two frame members 11 and 12 which are hinged to each other by the bolted connection and hinge pin 13. As seen from a comparison of FIGS. 1, 2 and 3, the cutter may be opened up from the position of FIG. 1 to the position of FIG. 2 and then closed down over a corrugated enclosure 14 (FIGS. 3 and 5) and secured thereto in a manner hereinafter described.

Frame member 12 is provided with an extending clevis 15 and frame member 11 is provided with an extending clevis 16. The members 11 and 12 are rotatable about the hinge 13 so that the clevises 15, 16 may extend parallel to each other. Clevis 15 carries clevis pin 20 which has a threaded hole 21 extending diametrically therethrough between the two arms 15a and 15b of the clevis 15. The arms 15a and 15b are respectively extensions of the sections 12a and 12b of the frame member 12. Similarly, the clevis 16 consists of two arms 16a and 16b which are respectively extensions of the frame sections 11a and 11b of the frame 11. Clevis 16 is also provided with a pin 25 having a through opening 26 therethrough. The through opening 26 is more readily seen in FIG. 3 and may be more readily described as a clearance hole in the pin 25.

A bolt 30 passes through the clearance hole or through opening 26 in the clevis pin 25 of clevis 16 and is threaded into the threaded opening 21 of the clevis pin 20 of the clevis 15. Spacer washers 30 and 31 are used at each end of the bolt and a compression spring 32 is provided therebetween.

The spring 32 permits the blade hereinafter described and the guide wheels as hereinafter described, to move in and out as needed during the cutting operation, in the event of any eccentricity in the structure of the tube 14 or any merely nominal variation in diameter.

The clevis pin 20 is carried in recesses 20a on the underside of arms 15a and 15b of clevis 15. In order to open the cutter, the pin 20 is pulled down out of the recesses 20a (see FIG. 2) against the bias of spring 32, and snaps out of the recesses 20a thereby freeing the cutter parts to be opened. Similarly, when closed, the pin 20 is snapped into the recesses 20a and the bolt 30 is tightened (to the appropriate bias for spring 32) by rotation of the shaped end 35 of bolt 32 by an appropriate tool.

Figure 5:
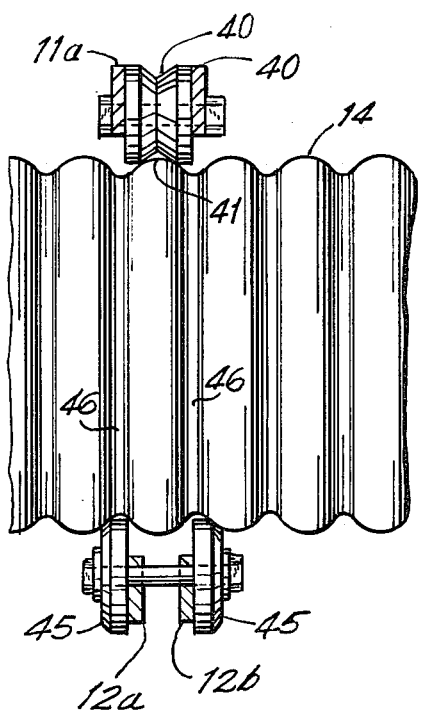
FIG. 5 is a view taken from line 5—5 of FIG. 3 looking in the direction of the arrows.
Figure 6:
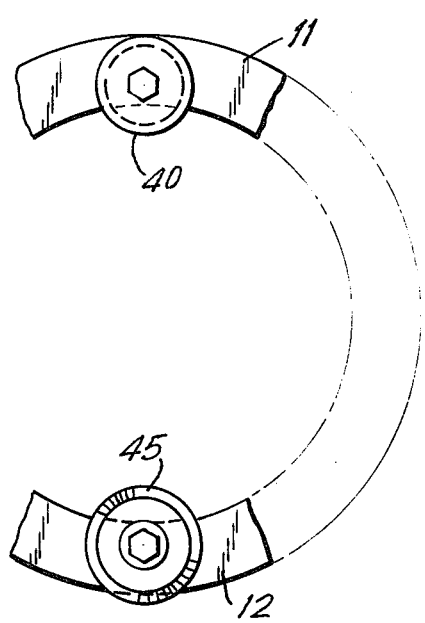
FIG. 6 is a partial side view of the cutting structure showing further the relationship of the guide rollers of FIG. 5 to each other.

The frame member 11 carries a pair of guide wheels 40, which are grouped as seen in FIGS. 4 and 5 and arranged to ride on the surface of a corrugation 41 of the corrugated enclosure 14. The wheels 40 are preferably aluminum and preferably will be engaged with the arcuate sections 41 of the enclosure 14 in order to position the knife structure and to guide it.

Figure 3:
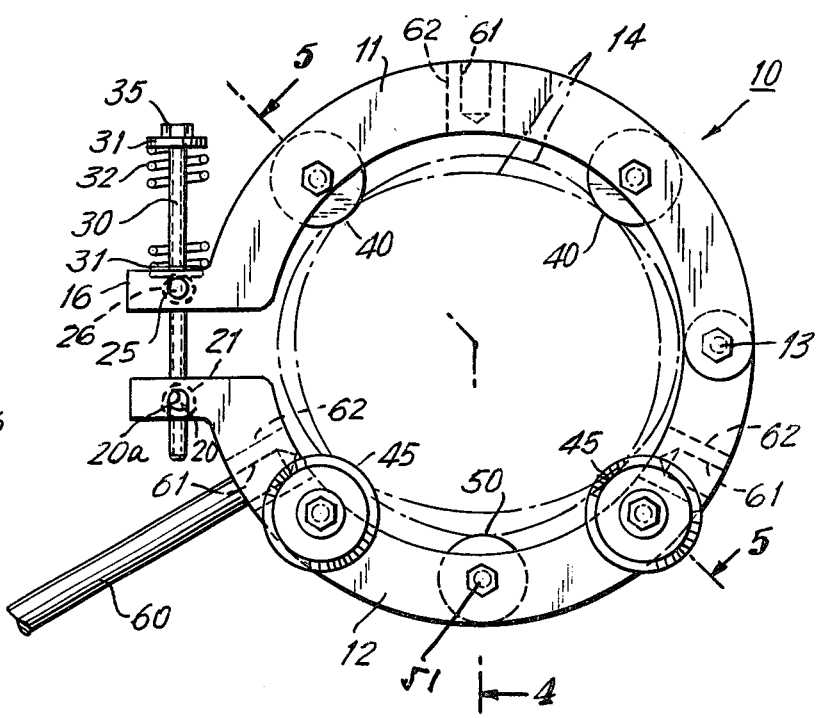
FIG. 3 is a side view of the structure of FIG. 1 showing the clamp carrying the cutter secured around an enclosure preparatory to cutting.

The frame member 12 also carries a pair of sets of wheels 45 as seen in FIGS. 1, 3 and 5. Wheels 45 are of resilient material such as polyurethane. Each of the wheels 45 is arranged to ride in a groove or recess 46 of the corrugated enclosure 14, on either side of corrugation 41. This provides for perfect centering of the cutter structure with respect to the desired location of the inlet at corrugation 41.

The cutting wheel 50 may readily be seen in FIGS. 1, 3, and 4 and is carried by the lower frame member 12 on the shaft 51 between the sets of resilient wheels 45; it comprises a pressure type of blade cutter which, when forced into the material of the corrugation 41, will tend to tear the material rather than have a sawing or chipping action, thereby preventing the formation of chips, particles or dust which may fall into the enclosure.

When the cutter is open from the position of FIG. 1, to the position of FIG. 2 and enclosed around the pipe 14 shown in FIGS. 3 and 5, the bolt head 35 is then operated to tighten the bolt until the cutting blade 50 is forced into the material of the enclosure 14. The cutter is then rotated around the tube 14 in order to effect the cut. It will be seen that owing to the utilization of the compression spring 32, variations in diameter of the tube 14 may be compensated for by the spring 32. Should such variations in diameter not be fully compensated, then when the shorter diameter of the cross section of the tube 14 is reached, the bolt 30 may be tightened by operation of bolt head 35; then the bolt may then thereaffter be relaxed to relieve the spring 32 slightly if a long diameter of the elliptical cross section is reached. Ordinarily since the enclosure is intended to be cylindrical with no intentional variation from true circularity of cross section any actual variation is expected to be small so that once the cutting blade is driven home, it is expected to be held in a cutting position during the full rotation of the cutter.

When the blade first engages the pipe, it does not initially pierce it; it requires three or four turns around the pipe to finally obtain a through cut.

The cutter itself is rotated by a handle 60 which fits into any one of the most convenient openings 61 of the cutting blocks 62. The frame section 12 of the cutter is provided with two such cutting handle blocks 62 separated approximately more than 90° from each other and the frame section 11 is provided in this case with one such cutting block 62 located between the guide rollers 40 on the said section 11.

The handle 60 may be inserted into any convenient opening 61 of any convenient handle block 62 to rotate the cutter and may be removed and reinserted for continued rotation of the cutter from one side of the enclosure 14 until the full cutting operation is achieved.

When the cutting operation is completed, then the bolt 30 may be backed off so that the cutter may be opened by pulling down pin 20 and operating the members to the position shown in FIG. 2 and withdrawn from the tubular enclosure 14.

In practice, two circumferential cuts are made first; then the cut tube is permitted to drop down (or out) as low as possible; then a longitudinal cut is made in the lowest portion to obviate the dropping of particles into the tube.

In opening up any section of the enclosure 14, at a fault or defective location, it may be desirable to make a cut which is not fully circumferential, but sufficient to permit an entry to be made within the enclosure. Thus in a structure of this type, two cuts spaced apart on either side of the fault location, and extending approximately 180° around the enclosure, plus a longitudinal cut to enable opening of the enclosure may permit full access to the interior for such repairs as are needed. It will be obvious of course that a full circumferential cut may be made, each at spaced locations and a longitudinal cut made to permit complete removal of a section of the enclosure so that a complete cleaning operation may occur after the fault has been repaired and thereafter a tubular member may be fitted into place and secured in an appropriate manner over the open section thus formed. It should be understood that the ability of the cutter to deflect as it is rotated around a pipe or enclosure 14 which is not fully round, is provided by utilization of resilient wheels 45 which may compress or deflect slightly to permit operation to occur. The compression spring 32 is designed primarily to maintain appropriate cutting contact between the blade 50 and the tubular member 14 for any expected deviation from the round.

In the foregoing, the present invention has been described in connection with a preferred illustrated embodiment thereof. Many variations and modifications of the present invention will now be obvious to those skilled in the art. It is preferred that the scope of this invention be determined not by this specific disclosure herein contained, but only by the attendant claims.

I claim:

1. A cutter for corrugated metal flexible pipe, said pipe having a plurality of successive circumferential corrugations, comprising successive high sections and troughs between the high sections;
    said cutter comprising a frame in the form of a ring;
    a first roller carried in said frame said first roller being adapted to ride on the high section of one corrugation of the pipe;
    and a pair of rollers substantially opposite said first roller and carried in said frame; each of said pair of rollers being adapted to ride in the trough on each side of the said high section on which said first mentioned roller is adapted to ride;
    a cutting blade carried by said ring and projecting inwardly from said ring;
    and means for pressing said blade toward said pipe wherein the first roller is a V-grooved roller having its vertex in the plane of the cutting blade, the first roller having planar lateral surfaces, and the pair of opposed rollers are each outwardly, laterally displaced from the V-groove of said first roller.

2. The cutter of claim 1 wherein said ring comprises a pair of C shaped members hingedly connected together at one end of each C shaped member and means for interconnecting the other ends of each C shaped member;

3. The cutter of claim 2 wherein said interconnecting means comprise a clevis on each C shaped member at said other end of each C shaped member;
    said means for pressing said blade toward said pipe also compressing said clevises toward each other.

4. The cutter of claim 3 wherein said means for compressing said clevises toward each other comprises a bolt, an extension on one said clevis slidably receiving said bolt; a compression spring between said bolt and said one extension; and extension on said other clevis; means for engaging said bolt with said extension on said other clevis for driving said clevises toward each other, said bolt being removable from said extension of said other clevis to permit separation of said clevises.

5. The cutter of claim 4 wherein said bolt is adjustable to change the effective length of said bolt and thereby change the force of the spring.

6. The cutter of claim 5 wherein a plurality of said first mentioned rollers adapted to ride on the high section of a corrugation and a plurality of said second mentioned opposed rollers are provided.

7. The cutter of claim 6 wherein said blade is carried on said ring between a pair of said opposed rollers.

8. The cutter of claim 7 wherein the rollers are provided with flanges and the flanges of said opposed pair of rollers are resiliently flexible permitting the C rings to be compressed toward each other and the blade to be driven toward said pipe.

9. The cutter of claim 8 wherein a plurality of handle receiving members are provided facing exteriorly of said ring; and a removable handle releasably engageable with said handle receiving members for rotating said ring and causing the blade to cut said pipe.

* * * * *